(12) United States Patent
Propheter-Hinckley

(10) Patent No.: US 11,077,494 B2
(45) Date of Patent: *Aug. 3, 2021

(54) METHOD AND CASTING CORE FOR FORMING A LANDING FOR WELDING A BAFFLE INSERTED IN AN AIRFOIL

(71) Applicant: United Technologies Corporation, Farmington, CT (US)

(72) Inventor: Tracy A. Propheter-Hinckley, Manchester, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 15/223,861

(22) Filed: Jul. 29, 2016

(65) Prior Publication Data

US 2016/0332226 A1 Nov. 17, 2016

Related U.S. Application Data

(63) Continuation of application No. 12/981,630, filed on Dec. 30, 2010, now Pat. No. 9,403,208.

(51) Int. Cl.
*B22C 9/10* (2006.01)
*B22C 9/24* (2006.01)
(Continued)

(52) U.S. Cl.
CPC ............... *B22D 25/02* (2013.01); *B22C 1/00* (2013.01); *B22C 9/04* (2013.01); *B22C 9/10* (2013.01); *B22C 9/103* (2013.01); *B22C 9/108* (2013.01); *B22C 9/18* (2013.01); *B22C 9/24* (2013.01); *B22D 29/001* (2013.01); *F01D 5/188* (2013.01); *F01D 9/041* (2013.01); *F01D 25/12* (2013.01); *F05D 2230/211* (2013.01); *F05D 2230/232* (2013.01); *F05D 2240/12* (2013.01);
(Continued)

(58) Field of Classification Search
CPC .............. B22C 9/10; B22C 9/103; B22C 9/24
USPC ......................................................... 164/369
See application file for complete search history.

(56) References Cited

U.S. PATENT DOCUMENTS 3,982,851 A 9/1976 Anderson et al.
4,421,153 A 12/1983 Wilkinson et al.
(Continued)

FOREIGN PATENT DOCUMENTS

EP 1180578 A1 8/2000
EP 1544414 A1 9/2004
(Continued)

OTHER PUBLICATIONS

European Search Report; Application No. 11195564; dated Jul. 5, 2012; 7 pages.
(Continued)

*Primary Examiner* — Kevin P Kerns
(74) *Attorney, Agent, or Firm* — Cantor Colburn LLP

(57) ABSTRACT

A method and casting core for forming a landing for welding a baffle inserted into an airfoil are disclosed, wherein the baffle landing of the blade or vane is formed in investment casting by the casting core rather than by wax, reducing tolerances and variability in the location of the baffle inserted into the cooling cavity of airfoil when the baffle is welded to the baffle landing.

4 Claims, 5 Drawing Sheets

(51) Int. Cl.
*B22D 25/02* (2006.01)
*B22C 9/04* (2006.01)
*B22C 1/00* (2006.01)
*B22C 9/18* (2006.01)
*B22D 29/00* (2006.01)
*F01D 5/18* (2006.01)
*F01D 9/04* (2006.01)
*F01D 25/12* (2006.01)

(52) U.S. Cl.
CPC .... *F05D 2240/126* (2013.01); *F05D 2240/30* (2013.01); *F05D 2260/201* (2013.01); *F05D 2300/13* (2013.01)

(56) References Cited

U.S. PATENT DOCUMENTS

| | | | |
|---|---|---|---|
| 5,203,873 | A | 4/1993 | Corsmeier et al. |
| 6,386,825 | B1 | 5/2002 | Burdgick |
| 6,435,256 | B1 | 8/2002 | Anderson et al. |
| 6,582,186 | B2 | 6/2003 | Manzoori et al. |
| 6,951,239 | B1 | 10/2005 | Snyder et al. |
| 6,984,101 | B2 | 1/2006 | Schiavo, Jr. |
| 7,008,178 | B2 | 3/2006 | Busch et al. |
| 7,056,083 | B2 | 6/2006 | Gray |
| 7,104,756 | B2 | 9/2006 | Harding et al. |
| 7,121,801 | B2 | 10/2006 | Surace et al. |
| 7,125,225 | B2 | 10/2006 | Surace et al. |
| 7,201,564 | B2 | 4/2007 | Bolms et al. |
| 7,217,093 | B2 | 5/2007 | Propheter et al. |
| 7,448,434 | B2 | 11/2008 | Turkington et al. |
| 7,731,481 | B2 | 6/2010 | Cunha et al. |
| 7,753,104 | B2 | 7/2010 | Luczak et al. |
| 7,762,784 | B2 | 7/2010 | Propheter-Hinckley |
| 7,798,773 | B2 | 9/2010 | Pellet et al. |
| 7,857,588 | B2 | 12/2010 | Propheter-Hinckley et al. |
| 8,109,724 | B2 | 2/2012 | Malecki et al. |
| 8,480,366 | B2 | 7/2013 | Malecki et al. |
| 9,403,208 | B2 * | 8/2016 | Propheter-Hinckley ............ B22C 9/04 |
| 2003/0180147 | A1 | 9/2003 | Bolms et al. |
| 2005/0135921 | A1 | 6/2005 | Busch et al. |
| 2005/0247425 | A1 | 11/2005 | Devine, II et al. |
| 2006/0021730 | A1 | 2/2006 | Marcin |
| 2006/0034679 | A1 | 2/2006 | Harding et al. |
| 2007/0056709 | A1 | 3/2007 | Schmidt et al. |
| 2007/0068649 | A1 | 3/2007 | Verner et al. |
| 2007/0095501 | A1 | 5/2007 | Beals et al. |
| 2007/0221359 | A1 | 9/2007 | Reilly |
| 2007/0235158 | A1 | 10/2007 | Bochiechio et al. |
| 2007/0261814 | A1 | 11/2007 | Luczak |
| 2007/0284411 | A1 | 12/2007 | Luczak |
| 2008/0099178 | A1 | 6/2008 | Propheter-Hinckley et al. |
| 2008/0135722 | A1 | 6/2008 | Wang et al. |
| 2008/0138209 | A1 | 6/2008 | Cunha et al. |
| 2008/0145235 | A1 | 6/2008 | Cunha et al. |
| 2008/0277090 | A1 | 11/2008 | Luczak et al. |
| 2009/0010765 | A1 | 1/2009 | Propheter-Hinckley et al. |
| 2009/0016873 | A1 | 1/2009 | Bridges et al. |
| 2009/0047136 | A1 | 2/2009 | Chon et al. |
| 2009/0067987 | A1 | 3/2009 | Pellet et al. |
| 2009/0074575 | A1 | 3/2009 | Propheter-Hinckley et al. |
| 2009/0092485 | A1 | 4/2009 | Bridges et al. |
| 2009/0185893 | A1 | 7/2009 | Propheter et al. |
| 2009/0232637 | A1 | 9/2009 | Propheter-Hinckley et al. |
| 2009/0246023 | A1 | 10/2009 | Chon et al. |
| 2010/0116452 | A1 | 5/2010 | Luczak et al. |
| 2010/0122789 | A1 | 5/2010 | Piggush et al. |
| 2010/0129194 | A1 | 5/2010 | Propheter-Hinckley et al. |
| 2010/0129195 | A1 | 5/2010 | Surace et al. |
| 2010/0129217 | A1 | 5/2010 | Cherolis et al. |
| 2010/0189556 | A1 | 7/2010 | Propheter-Hinckley et al. |
| 2010/0209229 | A1 | 8/2010 | Propheter-Hinckley et al. |
| 2010/0232946 | A1 | 9/2010 | Propheter-Hinckley et al. |
| 2010/0247284 | A1 | 9/2010 | Gregg et al. |
| 2010/0247327 | A1 | 9/2010 | Malecki et al. |
| 2010/0272559 | A1 | 10/2010 | Propheter-Hinckley |
| 2011/0058957 | A1 | 3/2011 | Von Arx et al. |
| 2012/0034100 | A1 | 2/2012 | Malecki et al. |

FOREIGN PATENT DOCUMENTS

| | | |
|---|---|---|
| EP | 1626162 A1 | 10/2005 |
| EP | 2011970 A2 | 3/2008 |
| EP | 1914030 A1 | 4/2008 |
| EP | 1939400 A2 | 7/2008 |
| EP | 2025864 A2 | 7/2008 |
| EP | 2233694 A1 | 3/2010 |
| WO | 2009121716 A1 | 10/2009 |

OTHER PUBLICATIONS

European Office Action; Application No. 11195564; dated Feb. 7, 2013; 2 pages.

* cited by examiner

METHOD AND CASTING CORE FOR FORMING A LANDING FOR WELDING A BAFFLE INSERTED IN AN AIRFOIL

CROSS REFERENCE TO RELATED APPLICATION

This application is a continuation of U.S. Pat. No. 9,403,208, filed Dec. 30, 2010, the contents of which are incorporated by reference herein in their entirety.

STATEMENT OF FEDERALLY SPONSORED RESEARCH OR DEVELOPMENT

The invention was made with U.S. Government support under contract No. N00019-02-C-3003 awarded by the U.S. Navy. The U.S. Government may have certain rights in the invention.

BACKGROUND OF THE INVENTION

The subject matter disclosed herein relates generally to baffles for impingement cooling of airfoils for gas turbine engines and, more particularly, to a method and casting core for forming a landing for welding a baffle inserted in an airfoil.

Gas turbine engines, such as those used to power modem commercial aircraft, to power sea vessels, to generate electrical power, and in industrial applications, include a compressor for pressurizing a supply of air, a combustor for burning a hydrocarbon fuel in the presence of the pressurized air, and a turbine for extracting energy from the resultant combustion gases. Generally, the compressor, combustor and turbine are disposed about a central engine axis with the compressor disposed axially upstream of the combustor and the turbine disposed axially downstream of the combustor. In operation of a gas turbine engine, fuel is injected into and combusted in the combustor in compressed air from the compressor thereby generating high-temperature combustion exhaust gases, which pass through the turbine in order to produce rotational shaft power. The shaft power is used to turn a turbine for driving a compressor to provide air to the combustion process to generate the high energy gases. Additionally, the shaft power is used to power a secondary turbine to, for example, drive a generator for producing electricity, or to produce high momentum gases for producing thrust.

The turbine includes a plurality of turbine stages, wherein each stage includes a stator section formed by a row of stationary vanes followed by a rotor section formed by a row of rotating blades. In each turbine stage, the upstream row of stationary vanes directs the combustion exhaust gases against the downstream row of blades. In order to produce gases having sufficient energy to drive both the compressor and the secondary turbine, it is necessary to compress the air to elevated temperatures and to combust the air, which again increases the temperature. Thus, the vanes and blades, each having an airfoil, are subjected to extremely high temperatures of the combustion exhaust gases, often times exceeding the melting point of the alloys used to make the airfoils.

The airfoils are maintained at temperatures below their melting point by, among other things, cooling the airfoils with a supply of relatively cooler air that is typically siphoned from the compressor. The cooling air is directed into the blade or vane to provide cooling of the airfoil through various modes, including impingement cooling. Specifically, the cooling air is passed into an interior of the airfoil through one or more cooling cavities in the airfoil to remove heat from the alloy. In some implementations, the cooling air is directed into one or more baffles installed within the cooling cavities in the airfoil and having a plurality of cooling holes. Cooling air flowing through the cooling holes of the baffle impinges on and flows against an interior surface of the airfoil. The cooling air then moves through film cooling holes in the airfoil to pass over the outer surface of the airfoil to prevent the hot gases from contacting the vane or blade.

As a general matter, the cooling air effectiveness of the baffle in cooling the airfoil is dependent upon the size of the impingement distance between the side portion of the baffle and the airfoil. Typically, there is an optimum distance between the baffle and the airfoil where cooling effectiveness is maximized. If the distance between the baffle and the airfoil is greater than the optimum distance, the cooling air disperses too much and the cooling effectiveness decreases. On the other hand, when the distance between the baffle and the airfoil is less than the optimum distance, the cooling air does not turbulate or expand sufficiently and the cooling effectiveness decreases. Also, when there are two baffles disposed in the same cooling cavity (i.e., one welded to the outer platform and one welded to the inner platform), the cooling air effectiveness of the baffles is affected by the distance (or gap) between the bottom of the two baffles inside the cooling cavity of the airfoil, with a smaller gap providing a greater amount of impingement cooling than a larger gap.

Baffles are hollow, sheet metal sock structures manufactured separately from the airfoil and later welded to landings on the platforms of the blades or vanes provided for that purpose. The blades or vanes, including the platforms and the airfoil, are typically manufactured using investment casting, a known technique for forming metallic components having complex geometries, especially hollow gas turbine engine components. During the investment casting process, the surfaces of platforms of the blades or vanes, including the baffle landings, are initially formed by wax, which can result in relatively high tolerances for the distance between the platforms that, in turn, determines the length of the airfoil cooling cavity into which the baffles are inserted. In addition, the surface profiles of the baffle landings initially formed on the platforms by wax are undulated, also resulting in relatively high surface tolerances. The relatively high tolerances for these landings can create problems when inserting the baffles into the cooling cavities of the airfoil.

For example, these relatively high tolerances can create relatively significant variability in the gap left between the baffle and the airfoil when the baffle is welded to the platform baffle landings. This is of particular concern where the cooling cavity is conic with large fillets and the baffle follows the conic shape of the cooling cavity. These relatively high tolerances can also create relatively significant variability in the gap left between two baffles when welded to the baffle landings at opposite ends of the cooling cavity. These gaps between the baffles and the airfoil and between the baffles themselves affect the cooling air effectiveness of the baffles as discussed previously. Similarly, if the distance between the inner platform and outer platform is too small as a result of the cumulative tolerances, there may not be sufficient length in the cooling cavity to insert two baffles as they would clash in the cooling cavity rather than leaving a gap. There is, therefore, a need to provide less variability in the location of the baffles inserted into the cooling cavities of airfoils when the baffles are welded to the baffle landings of the blades or vanes.

BRIEF SUMMARY OF THE INVENTION

A method and casting core for forming a landing for welding a baffle inserted into an airfoil are disclosed, wherein the baffle landing of the blade or vane is formed in investment casting by the casting core rather than by wax, reducing tolerances and variability in the location of the baffle inserted into the cooling cavity of airfoil when the baffle is welded to the baffle landing.

According to one embodiment, a method of forming a landing for welding a baffle inserted into a cooling cavity of an airfoil is provided. The method comprises the steps of forming a casting core having a first portion in the shape of the landing, overmolding the casting core with wax to form a casting pattern having a first portion in the shape of the landing, shelling the casting pattern with a shell, removing the casting pattern to form a void between the shell and the casting core, pouring metal into the void to surround the casting core, and removing the shell, wherein the landing is formed by the first portion of the casting core in the shape of the landing.

In another embodiment, a method of forming a first landing for welding a first baffle inserted into a cooling cavity of an airfoil and a second landing for welding a second baffle inserted into the cooling cavity is provided. The method comprises the steps of forming a casting core having a first portion in the shape of the first landing and a second portion in the shape of the second landing, overmolding the casting core with wax to form a casting pattern having a first portion in the shape of the first landing and a second portion in the shape of the second landing, shelling the casting pattern with a shell, removing the casting pattern to form a void between the shell and the casting core, pouring metal into the void to surround the casting core, and removing the shell, wherein the first landing is formed by the first portion of the casting core in the shape of the first landing and the second landing is formed by the second portion of the casting core in the shape of the second landing.

In yet another embodiment, a casting core for forming a first landing for welding a first baffle inserted into a cooling cavity of an airfoil is provided, wherein a first portion of the casting core is the shape of the first landing.

BRIEF DESCRIPTION OF THE DRAWINGS

For a further understanding of the disclosure, reference will be made to the following detailed description which is to be read in connection with the accompanying drawing, wherein.

DETAILED DESCRIPTION OF THE INVENTION

Figure 1:
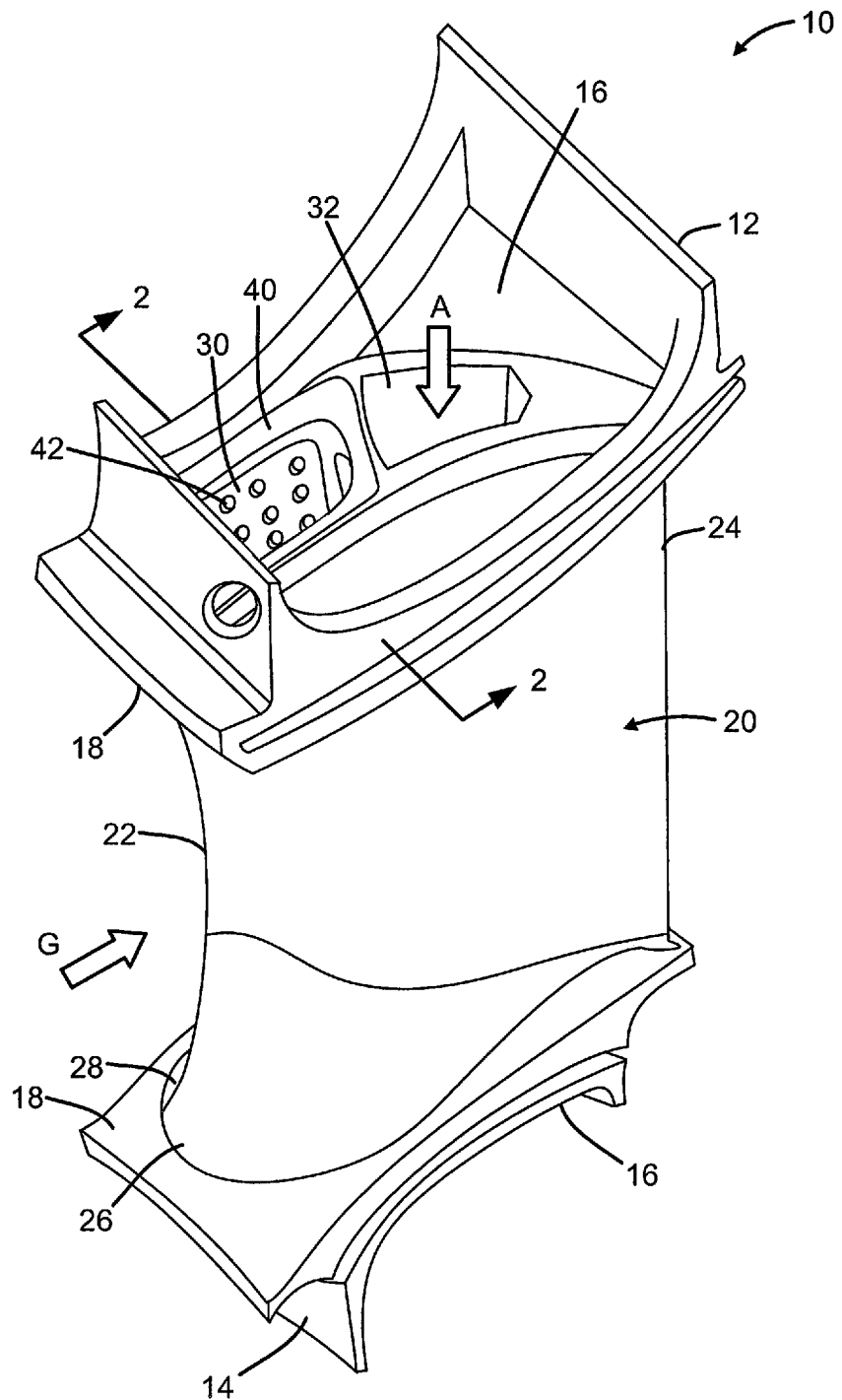
FIG. 1 is a perspective view of an exemplary stationary turbine vane having an airfoil with a plurality of cooling cavities.

FIG. 1 is a perspective view of an exemplary stationary turbine vane 10 having an airfoil 20 with a plurality of cooling cavities 30, 32 spanning the length of the airfoil 20. Although the embodiment is disclosed using an exemplary stationary turbine vane, the inventive concepts disclosed herein are not limited to stationary turbine vanes, but can be applied to other turbine blades and vanes having airfoils 20 with one or more cooling cavities 30, 32 for inserting a first baffle 40 (e.g., a vane used in the compressor section of a gas turbine engine).

Returning to FIG. 1, the stationary turbine vane 10 receives high temperature gas G and cooling air A in a turbine section of a gas turbine engine. Turbine vanes 10 operate to increase the efficiency of the gas turbine engine in which they are installed. The turbine vane 10 has an outer platform 12, an inner platform 14, and airfoil 20. The outer platform 12 and the inner platform 14 are connected to adjacent platforms within the gas turbine engine to form structures between which a plurality of airfoils 20 are supported. The outer platform 12 and inner platform 14 increase the efficiency of the gas turbine engine by forming outer and inner boundaries for the flow of high temperature gas G through the gas turbine engine, preventing the escape of high temperature gas G from the gas turbine engine such that more air is available for performing work. The shape of vane 10 also increases the efficiency of the gas turbine engine. Vane 10 generally functions to redirect the trajectory of high temperature gas G coming from a combustor section or a blade of an upstream turbine stage to a blade of a downstream turbine stage.

The outer diameter end of the airfoil 20 mates with the outer platform 12, and the inner diameter end of the airfoil 20 mates with the inner platform 14. The airfoil 20 has a leading edge 22, a trailing edge 24, a pressure side 26, and a suction side 28. High temperature gas G flows across the vane 10, impinges on leading edge 22 of the airfoil 20 and flows across the pressure side 26 and he suction side 28 of the airfoil 20. The pressure side 26 and the suction side 28 of the airfoil 20 redirect the flow of high temperature gas G received at the leading edge 22 such that, after passing by the trailing edge 24, the incidence of high temperature gas G on the subsequent rotor blade stage is optimized. As such, more work can be extracted from the interaction of high temperature gas G with downstream blades.

The efficiency of the gas turbine engine is also improved by increasing the temperature to which the vane 10 can be subjected. For example, the vane 10 is often positioned immediately downstream of a combustor section of a gas turbine engine where the temperature of high temperature gas G is hottest. The airfoil 20 is, therefore, subjected to a concentrated, steady stream of high temperature gas G during operation of the gas turbine engine. The extremely elevated temperatures of combustion high temperature gas G often exceed the melting point of the material forming the vane 10. The airfoil 20 is therefore cooled using cooling air A provided by, for example, relatively cooler air bled from a compressor section within the gas turbine engine and forced through a plurality of cooling cavities 30, 32 in the airfoil 20, including a leading edge cooling cavity 30 and a trailing edge cavity 32. Both the inner platform 14 and the outer platform 12 have a non-gas path side 16, where the cooling air A flows, and a gas-path side 18 where the high temperature gas G flows.

In this exemplary embodiment shown in FIG. 1, a first baffle 40 with a plurality of cooling holes 42 is inserted through the outer platform 12 in the leading edge cooling cavity 30. Cooling air A enters the first baffle 40, passes through cooling holes 42 and enters the cooling cavity 30 to perform impingement cooling on the interior of the airfoil 20. The first baffle 40 is typically joined, such as by welding, to the outer platform 12. In the exemplary embodiment, a second baffle 50 (not visible in FIG. 1) is inserted through the inner platform 14 in the leading edge cooling cavity and is typically joined, such as by welding, to the inner platform 14.

Figure 2:
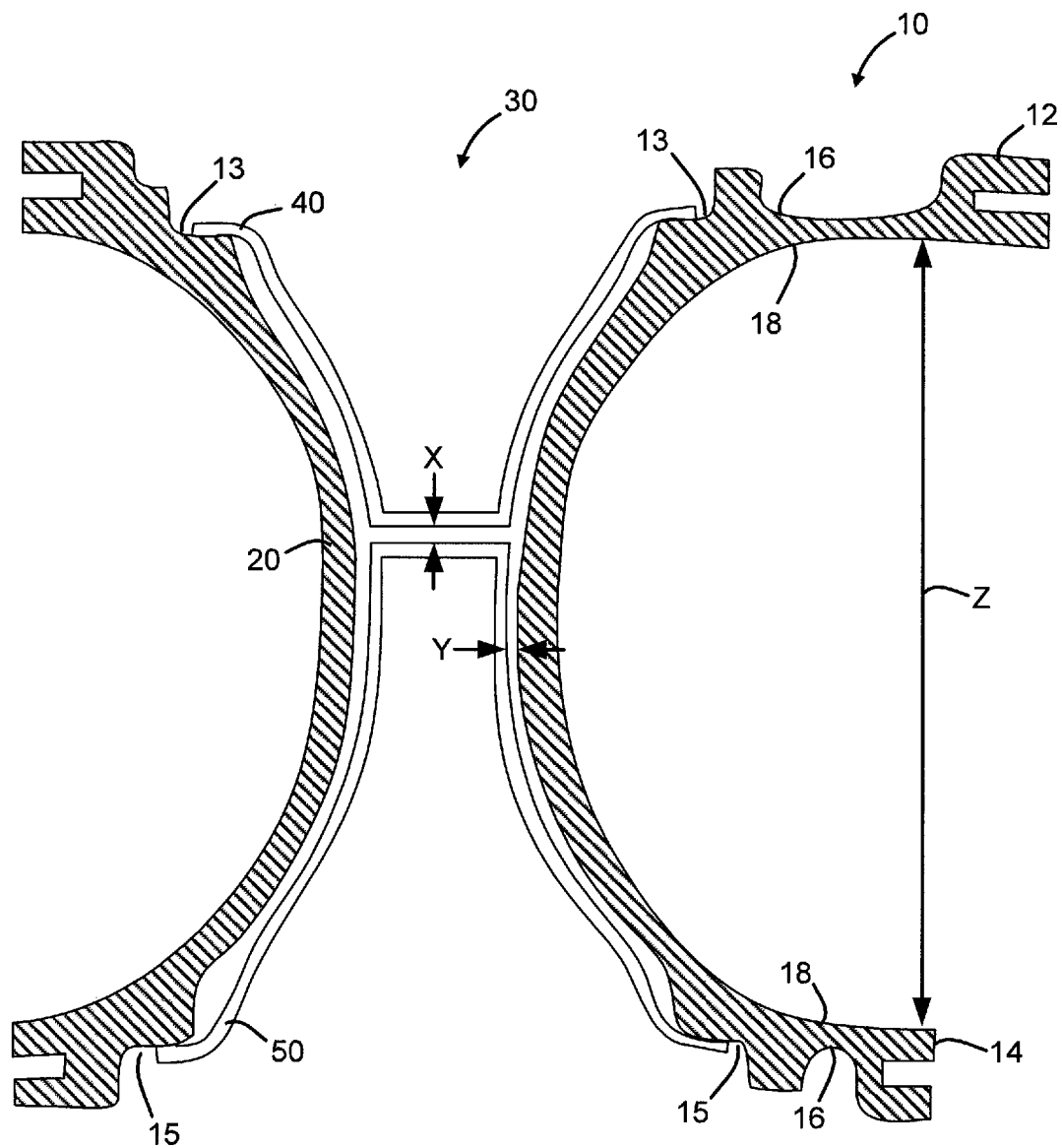
FIG. 2 is a cross-sectional view of the exemplary stationary turbine vane of FIG. 1.

FIG. 2 is a cross-sectional view of the exemplary stationary turbine vane 10 of FIG. 1. As shown in the figure, there is a distance Z between the outer platform 12 and the inner platform 14. FIG. 2 also shows the first baffle 40 welded to first baffle landings 13 on the outer platform 12 and the second baffle 50 welded to second baffle landings 15 on the inner platform 14. The baffles 40, 50 are inserted into the cooling cavity 30 of the airfoil 20 in a configuration that provides a distance X between the bottom portions of the two baffles 40, 50 and a distance Y between the side portions of the two baffles 40, 50 and the conic interior surface of the airfoil 20, which has large fillets. The distance Y is the impingement cooling distance. Although the embodiment disclosed includes a plurality of baffles 40, 50, it will be understood that a single baffle may also be used.

As can be seen in FIG. 2, if the distance Z between the outer platform 12 and the inner platform 14 were to vary based on manufacturing tolerances allowing the platforms 12, 14 to shift relative to each other, the distance X between the bottom portions of the two baffles 40, 50 and the distance Y between the side portions of the two baffles 40, 50 and the conic interior surface of the airfoil 20 would also vary. For example, if the distance Z were to decrease from what is shown in FIG. 2, causing the first baffle landings 13 to be closer to the second baffle landings 15, the distance X would also decrease. In a case where the distance Z decreased significantly, the distance X could be completely eliminated, preventing the first baffle 40 from being installed in the same cooling cavity 30 as the second baffle 50 as they would clash during installation. On the other hand, if the distance Z were to increase from what is shown in FIG. 2, causing the first baffle landings 13 to be further from the second baffle landings 15, the distance X would also increase, decreasing the amount of impingement cooling provided by the baffles 40, 50. In addition, variability in the distance Z would cause the distance Y between the side portions of the baffles 40, 50, and the interior of the airfoil 20, all of which are conic, to vary from an optimum distance, decreasing the amount of impingement cooling effectiveness provided by the baffles 40, 50. The distances X, Y are also affected by variability in the location of the baffle landings 13, 15 apart from the distance Z. For example, if the surface profiles of both the first baffle landings 13 and the second baffle landings 15 were to be raised or lowered, this would also move the baffles 40, 50 with respect to each other and the interior surface of the airfoil. As discussed previously, the turbine vane 10, including the airfoil 20, the platforms 12, 14, the baffle landings 13, 15 are typically manufactured using investment casting. By manufacturing the baffle landings 13, 15 in a manner that minimizes tolerances, which, in turn, greatly reduces the variability in the location of the baffle landings 13, 15, many of these issues can be resolved.

Figure 3:
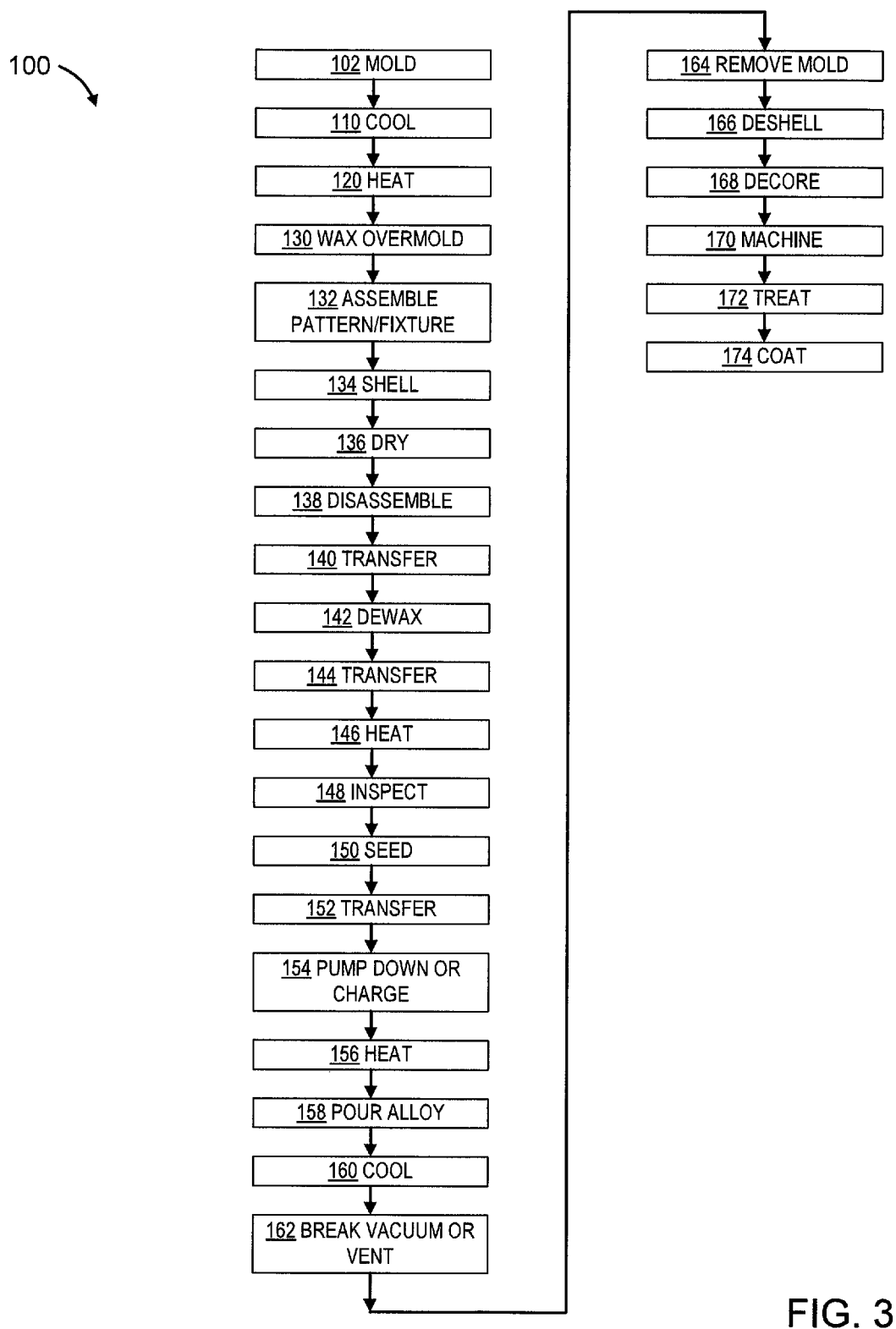
FIG. 3 is a flowchart of an exemplary method for investment casting the exemplary stationary turbine vane of FIG. 1.

FIG. 3 is a flowchart of an exemplary method 100 for investment casting the exemplary stationary turbine vane of FIG. 1. Other methods are possible, including a variety of prior art methods and yet-developed methods. Initially, a moderately flexible ceramic polymer casting core in the shape of a cooling cavity 30 is molded 102 by injection molding. For ease of discussion, the investment casting process is described with respect to only one of the cooling cavities 30, 32, the leading edge cavity 30. After forming the ceramic polymer casting core and letting it cool 110, the casting core is placed into a furnace where it is heated 120 to burn out and remove the polymer, leaving a rigid ceramic casting core. Other casting cores can also be used, including casting cores formed with refractory metal (RMCs).

The casting core is placed in a die and then overmolded 130 with an easily sacrificed material such as a natural or synthetic wax. The overmolded casting core forms a casting pattern with an exterior shape largely corresponding to the exterior shape of the airfoil 20 and platforms 12, 14. The casting pattern may then be assembled 132 to a shelling fixture (e.g., via wax welding between end plates of the fixture). The casting pattern may then be shelled 134 (e.g., via one or more stages of slurry dipping, slurry spraying, or the like). After the shell is built up, it may be dried 136. The drying provides the shell with at least sufficient strength or other physical integrity properties to permit subsequent processing. For example, the shell containing the invested casting core may be disassembled 138 fully or partially from the shelling fixture and then transferred 140 to a dewaxer (e.g., a steam autoclave). In the dewaxer, a steam dewax process 142 removes a major portion of the wax leaving the casting core secured within the shell. The shell and casting core will largely form the ultimate mold. However, the dewax process typically leaves a wax or byproduct hydrocarbon residue on the shell interior and the casting core.

After the dewax, the shell is transferred 144 to a furnace (e.g., containing air or other oxidizing atmosphere) in which it is heated 146 to strengthen the shell and remove any remaining wax residue (e.g., by vaporization) and/or converting hydrocarbon residue to carbon. Oxygen in the atmosphere reacts with the carbon to form carbon dioxide. Removal of the carbon is advantageous to reduce or eliminate the formation of detrimental carbides in the metal casting. Removing carbon offers the additional advantage of reducing the potential for clogging the vacuum pumps used in subsequent stages of operation.

The mold may be removed from the atmospheric furnace, allowed to cool, and inspected 148. The mold may be seeded 150 by placing a metallic seed in the mold to establish the ultimate crystal structure of a directionally solidified (DS) casting or a single-crystal (SX) casting. The present teachings may be applied to other DS and SX casting techniques (e.g., wherein the shell geometry defines a grain selector) or to casting of other microstructures. The mold may be transferred 152 to a casting furnace (e.g., placed atop a chill plate in the furnace). The casting furnace may be pumped down to vacuum 154 or charged with a non-oxidizing atmosphere (e.g., inert gas) to prevent oxidation of the casting alloy. The casting furnace is heated 156 to preheat the mold. This preheating serves two purposes: to further harden and strengthen the shell, and to preheat the shell for the introduction of molten alloy to prevent thermal shock and premature solidification of the alloy.

After preheating and while still under vacuum conditions, the molten alloy is poured 158 into the mold and the mold is allowed to cool to solidify 160 the alloy (e.g., after withdrawal from the furnace hot zone). After solidification, the vacuum may be broken 162 and the chilled mold removed 164 from the casting furnace. The shell may be removed in a deshelling process 166 (e.g., mechanical breaking of the shell).

The casting core is removed in a decoring process 168 to leave a cast article (e.g., a metallic precursor of the ultimate part). The cast article may be machined 170, chemically and/or thermally treated 172 and coated 174 to form the ultimate part. Some or all of any machining or chemical or thermal treatment may be performed before the decoring.

Figure 4:
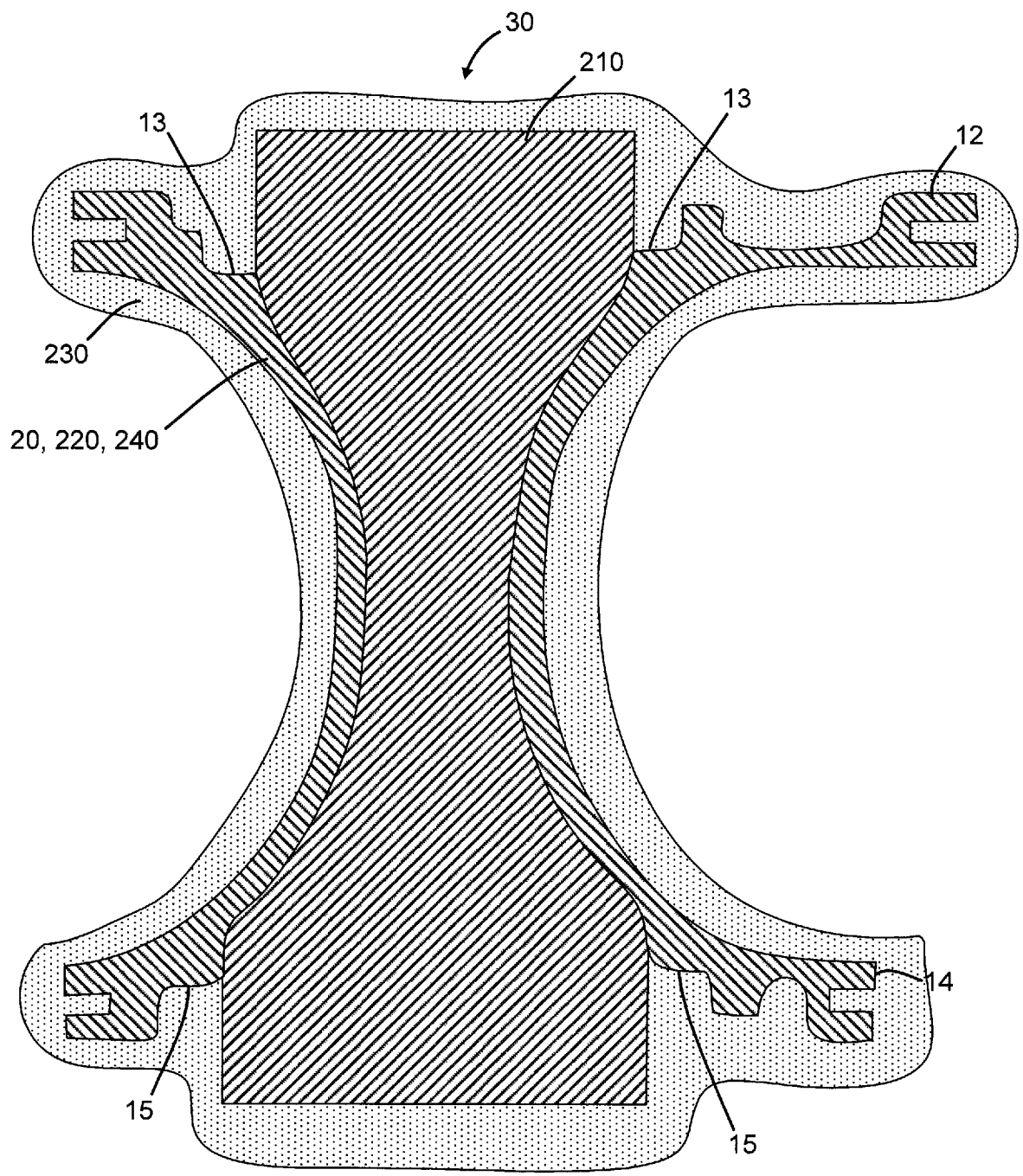
FIG. 4 illustrates a prior art method and casting core for forming baffle landings for welding baffles in an airfoil.

FIG. 4 illustrates a prior art method and casting core 210 for forming baffle landings 13, 15 for welding baffles 40, 50 in an airfoil 20 using the exemplary method 100 of FIG. 3. As can be seen in the figure, a casting core 210 is formed in the shape of a cooling cavity 30 and placed in a die (not shown) in the shape of the airfoil 20 and platforms 12, 14, including the baffle landings 13, 15. Wax 220 is injection molded into the die where it fills in the voids between the casting core 210 and the die and overmolds the casting core 210 forming a casting pattern in the shape of the exterior of the airfoil 20 and the platforms 12, 14, including the baffle landings 13, 15. Notably, it is the wax 220 that initially forms the shape of the platforms 12, 14, including the baffle landings 13, 15, as the casting core 210 only forms the shape of the cooling cavity 30 of the airfoil 20 as the diameter of the casting core 210 extending beyond the platforms 12, 14 does not exceed the diameter of the cooling cavity 30 where the airfoil 20 mates with the platforms 12, 14. This wax 220 is then shelled by covering the casting pattern with a ceramic slurry shell 230. After the ceramic slurry shell 230 dried and hardened, the wax 220 casting pattern is removed leaving a void between the ceramic slurry shell 230 and the casting core 210 in the shape of the airfoil 20 and the platforms 12, 14. This void where the wax 220 once resided is later filled by a molten alloy 240 that engulfs the casting core 210 in metal and ultimately forms the airfoil 20 and the platforms 12, 14. The ceramic slurry shell 230 is knocked off and the casting core 210 is removed (e.g., by using a caustic liquid) leaving the finished part behind.

With reference again to FIG. 2, it has been found that using the prior art method and casting core 210 as illustrated in FIG. 4, the distance Z between the outer platform 12 initially formed by the wax 220 and the inner platform 14 initially formed by the wax 220 can have a tolerance as high as ±0.014 in. (0.3556 mm). It has also been found that the surface profiles of both the first baffle landings 13 initially formed by the wax 220 and the second baffle landings 15 initially formed by the wax 220 can have tolerances as high as ±0.015 in. (0.381 mm) for each landing 13, 15, resulting in a cumulative tolerance of up to ±0.044 in. (1.1176 mm)) for wax 220 tolerances alone. In addition, it has been found that the cooling cavity 30 formed by the casting core 210 can shift relative to the platforms 12, 14 by as much as 0.015 in. (0.381 mm) in one direction and by as much as 0.030 in. (0.762 mm) in the other direction. These relatively high tolerances can cause the distance X between the bottom portions of the two baffles 40, 50 and the distance Y between the side portions of the two baffles 40, 50 and the conic interior surface of the airfoil 20 to vary greatly as described previously. It has also been found the tolerances for parts formed by the casting core 210 (e.g., the cooling cavity 30 of the airfoil 20 formed by the ceramic casting core) have much lower tolerances (e.g., ±0.004 in (0.1016 mm)).

Figure 5:
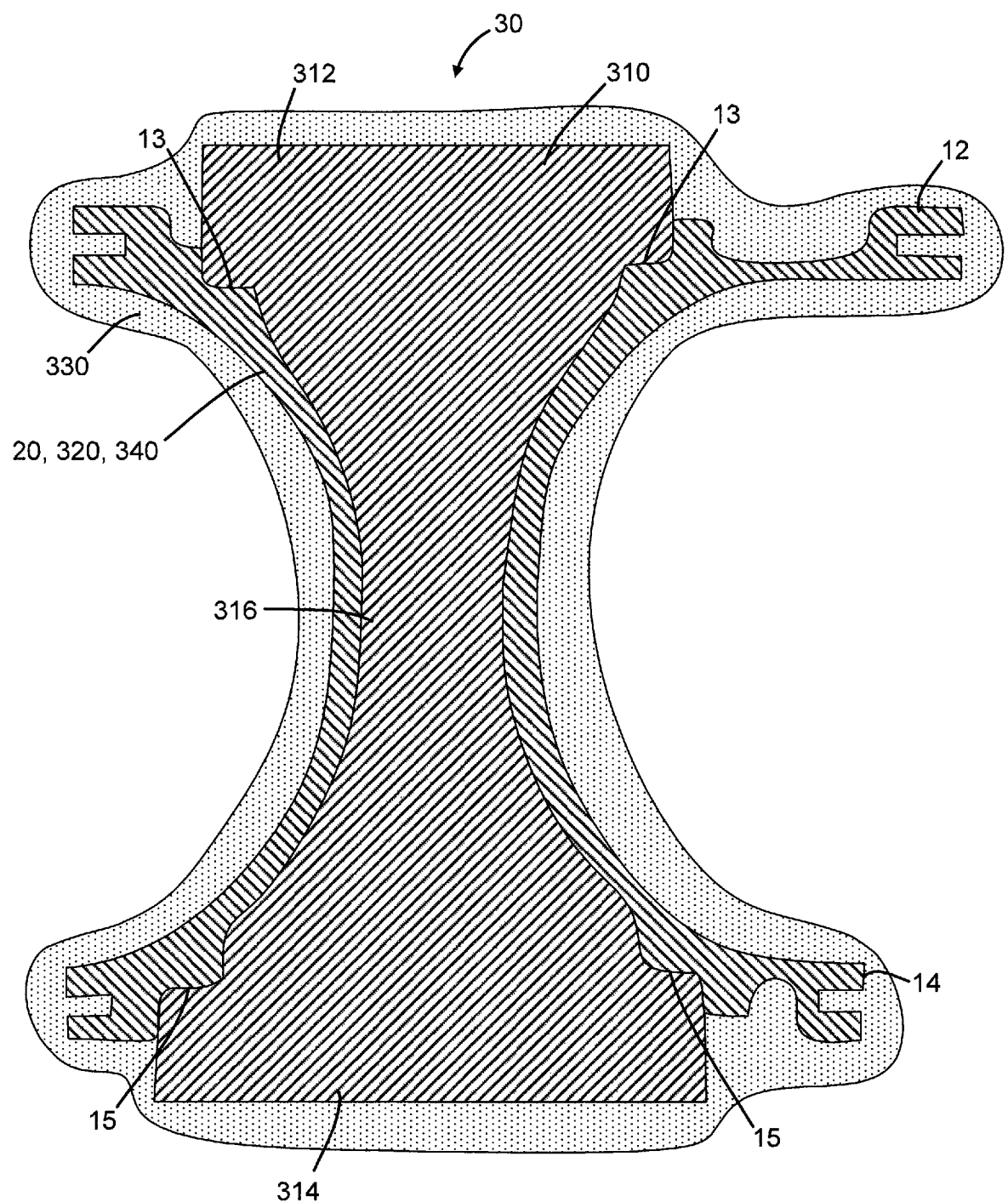
FIG. 5 illustrates a method and casting core for forming baffle landings for welding baffles in an airfoil.

FIG. 5 illustrates a method and casting core 310 for forming baffle landings 13, 15 for welding baffles 40, 50 in an airfoil 20 using the exemplary method 100 of FIG. 3. As can be seen in the figure, at least a first portion 312 of the casting core 310 is formed in the shape of the first baffle landings 13, a second portion 314 of the casting core is formed in the shape of the second baffle landings 15, and a third portion 316 of the casting core 310 is formed in the shape of the cooling cavity 30, and placed in a die (not shown) in the shape of the airfoil 20 and platforms 12, 14, including the baffle landings 13, 15. Wax 320 is injection molded into the die where it fills in the voids between the casting core 310 and the die and overmolds the casting core 310 forming a casting pattern in the shape of the exterior of the airfoil 20 and the platforms 12, 14, including the baffle landings 13, 15. Notably, the wax 320 initially forms the shape of the platforms 12, 14, except for the baffle landings 13, 15, as the casting core 310 forms the shape of the cooling cavity 30 of the airfoil 20 and the baffle landings 13, 15 as the diameter of the first portion 312 and second portion 314 of the casting core 310 extending beyond the platforms 12, 14 exceeds the diameter of the cooling cavity 30 where the airfoil 20 mates with the platforms 12, 14 to form the baffle landings 13, 15. This wax 320 is then shelled by covering the casting pattern with a ceramic slurry shell 330. After the ceramic slurry shell 330 is dried and hardened, the wax 320 casting pattern is removed leaving a void between the ceramic slurry shell 330 and the casting core 310 in the shape of the airfoil 20 and the platforms 12, 14. This void where the wax 320 once resided is later filled by a molten alloy 340 that engulfs the casting core 310 in metal and ultimately forms the airfoil 20 and the platforms 12, 14. The ceramic slurry shell 330 is knocked off and the casting core 310 is removed (e.g., by using a caustic liquid) leaving the finished part behind.

With reference again to FIG. 2, it has been found that using the method and casting core 310 as illustrated in FIG. 5, the distance Z between the portions of the outer platform 12 initially formed by the wax 320 and portions of the inner platform 14 initially formed by the wax 320 does not have any effect on the relative location of the baffle landings 13, 15, which are now fixed by the casting core 310 that includes the shape of the baffle landings 13, 15. It has also been found that the surface profiles of both the first baffle landings 13 initially formed by the casting core 310 and the second baffle landings 15 initially formed by the casting core 310 can have tolerances of only ±0.004 in (0.1016 mm) for each landing 13, 15, resulting in a cumulative tolerance of only ±0.008 in (0.2032 mm)). It has also been found that the use of the casting core 310 to form the baffle landings 13, 15 eliminates any tolerances associated with the shifting of the cooling cavity 30 formed by the casting core 310 relative to the platforms 12, 14. These relatively low or eliminated tolerances minimize the variability of the distance X between the bottom portions of the two baffles 40, 50 and the distance Y between the side portions of the two baffles 40, 50 and the conic interior surface of the airfoil 20, improving the cooling effectiveness of the baffles 40, 50 and simplifying installation of the baffles 40, 50.

The terminology used herein is for the purpose of description, not limitation. Specific structural and functional details disclosed herein are not to be interpreted as limiting, but merely as basis for teaching one skilled in the art to employ the present invention. While the present invention has been particularly shown and described with reference to the exemplary embodiments as illustrated in the drawing, it will be recognized by those skilled in the art that various modifications may be made without departing from the spirit and scope of the invention. Those skilled in the art will also recognize the equivalents that may be substituted for elements described with reference to the exemplary embodiments disclosed herein without departing from the scope of the present invention.

Therefore, it is intended that the present disclosure not be limited to the particular embodiment(s) disclosed as, but that the disclosure will include all embodiments falling within the scope of the appended claims.

What is claimed is:

1. A casting core for forming a first landing for welding a first baffle inserted into a cooling cavity of an airfoil, said casting core comprising:
a first landing portion in the shape of the first landing, the first landing portion including a laterally-extending first step portion being configured to mold the first landing as a spanwise-facing surface of the airfoil relative to an airfoil span direction onto which a first baffle is welded providing a spanwise locating surface for the first baffle, the first portion disposed at one of an outer platform end or an inner platform end, the outer platform end and the inner platform end disposed at opposing longitudinal ends of the casting core; and
a cooling cavity portion extending longitudinally between the outer platform end and the inner platform end;
the first landing portion extending substantially perpendicularly laterally from the cooling cavity portion;
wherein the surface on which the first baffle is welded extends laterally outwardly from the cooling cavity portion.

2. The casting core of claim 1, further comprising a second landing portion in the shape of a second landing for welding a second baffle inserted into the cooling cavity, the second portion disposed at the other of the outer platform end and the inner platform end of the casting core, the second landing portion including a laterally-extending second step portion being configured to mold the second landing as a spanwise-facing surface.

3. The casting core of claim 1, wherein the casting core is a ceramic polymer.

4. The casting core of claim 1, wherein the casting core is a refractory metal core.

* * * * *